(12) United States Patent
Bertram et al.

(10) Patent No.: US 7,903,648 B2
(45) Date of Patent: *Mar. 8, 2011

(54) METHOD AND APPARATUS FOR INJECTING INFORMATION ASSETS INTO A CONTENT STREAM

(75) Inventors: Michael C. Bertram, San Jose, CA (US); Tobie J. LaRocca, San Jose, CA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 481 days.

This patent is subject to a terminal disclaimer.

(21) Appl. No.: 11/780,053

(22) Filed: Jul. 19, 2007

(65) Prior Publication Data

US 2008/0013536 A1    Jan. 17, 2008

Related U.S. Application Data

(63) Continuation of application No. 11/050,381, filed on Feb. 3, 2005, now Pat. No. 7,248,581, which is a continuation of application No. 09/458,896, filed on Dec. 10, 1999, now Pat. No. 6,996,098.

(60) Provisional application No. 60/127,126, filed on Mar. 31, 1999.

(51) Int. Cl.
*H04L 12/28* (2006.01)
(52) U.S. Cl. .......................................... 370/389; 725/86
(58) Field of Classification Search .................. None
See application file for complete search history.

(56) References Cited

U.S. PATENT DOCUMENTS

| | | | |
|---|---|---|---|
| 5,544,161 A | 8/1996 | Bigham et al. | |
| 5,566,174 A | 10/1996 | Sato et al. | |
| 5,570,361 A | 10/1996 | Norizuki et al. | |
| 5,640,389 A | 6/1997 | Masaki et al. | |
| 5,648,960 A | 7/1997 | Sakazaki et al. | |
| 5,650,825 A | 7/1997 | Naimpally | |
| 5,663,959 A | 9/1997 | Nakagawa | |
| 5,684,799 A | 11/1997 | Bigham et al. | |
| 5,745,696 A | 4/1998 | Mendelson et al. | |
| 5,781,228 A * | 7/1998 | Sposato | 725/32 |
| 5,793,980 A | 8/1998 | Glaser et al. | |
| 5,801,781 A | 9/1998 | Hiroshima et al. | |
| 5,826,166 A | 10/1998 | Brooks et al. | |
| 5,850,218 A | 12/1998 | LaJoi et al. | |
| 5,862,140 A | 1/1999 | Shen et al. | |
| 5,917,830 A | 6/1999 | Chen et al. | |
| 5,933,607 A | 8/1999 | Tate et al. | |
| 6,041,056 A | 3/2000 | Bigham et al. | |
| 6,154,772 A * | 11/2000 | Dunn et al. | 725/114 |
| 6,240,553 B1 * | 5/2001 | Son et al. | 725/95 |
| 6,253,375 B1 * | 6/2001 | Gordon et al. | 725/88 |
| 6,353,930 B1 * | 3/2002 | Shimoji et al. | 725/110 |

(Continued)

FOREIGN PATENT DOCUMENTS

JP      11-163817      6/1999

*Primary Examiner* — Phirin Sam
(74) *Attorney, Agent, or Firm* — Banner & Witcoff, Ltd.

(57) ABSTRACT

A method and apparatus for transport encoded asset data and content data, multiplexing the transport encoded content data with a plurality of NULL transport packets to provide "place holder" for the asset data transport packets, and replacing the NULL transport packets with asset data transport packets prior to transmitting the multiplexed transport stream to a set top box.

47 Claims, 4 Drawing Sheets

U.S. PATENT DOCUMENTS

| | | |
|---|---|---|
| 6,643,298 B1 | 11/2003 | Brunheroto et al. |
| 6,757,911 B1 * | 6/2004 | Shimoji et al. ............... 725/136 |
| 6,898,800 B2 * | 5/2005 | Son et al. ...................... 725/93 |
| 6,996,101 B2 | 2/2006 | Coup et al. |
| 7,065,782 B2 | 6/2006 | Shimoji et al. |
| 7,536,705 B1 * | 5/2009 | Boucher et al. ............... 725/112 |
| 2002/0035728 A1 * | 3/2002 | Fries ............................... 725/68 |
| 2004/0088739 A1 | 5/2004 | Shimoji et al. |

* cited by examiner

METHOD AND APPARATUS FOR INJECTING INFORMATION ASSETS INTO A CONTENT STREAM

CROSS REFERENCE TO RELATED APPLICATIONS

This application is a continuation of U.S. patent application Ser. No. 11/050,381, filed on Feb. 3, 2005 now U.S. Pat. No. 7,248,581, which application is a continuation of application Ser. No. 09/458,896, filed on Dec. 10, 1999 (now U.S. Pat. No. 6,996,098), which application claims benefit of U.S. Provisional Patent Application Ser. No. 60/127,126, which was filed on Mar. 31, 1999; all prior applications are incorporated herein by reference in their entireties.

BACKGROUND OF THE INVENTION

1. Field of the Invention

The present invention relates to an information distribution system such as a video-on-demand (VOD) system. More particularly, the present invention relates to a method and apparatus for processing content and other assets such that the other assets may be injected into a subsequent content stream.

2. Description of the Background Art

Information distribution systems, such as video on demand (VOD) system providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference.

An interactive information distribution system provided by DIVA Systems Corporation of Redwood City, Calif. is described in more detail in U.S. Pat. No. 6,253,375, which is incorporated herein by reference in its entirety. Users or subscribers to the DIVA system select information offerings using a "Navigator" functionality, which is described in more detail in U.S. Pat. No. 6,253,375 and incorporated herein by reference in its entirety. Briefly, the Navigator utilizes a combination of MPEG content (such as MPEG video content and related MPEG audio content) and Navigator asset data to provide viewers with a means of selecting and ordering services. Navigator assets include bitmaps and navigation control scripts. As the set top box user is "navigating," the set top box extracts the asset data from the transport stream and uses that data to provide bitmap overlays on top of the MPEG content. The control data within the assets is used to define the layout of the screen and to take actions based on viewer input.

Assets, such as the aforementioned Navigator assets, are typically packaged as MPEG transport packets that are multiplexed along with content-representative MPEG packets to produce a single MPEG transport stream file. The file is then transported to and stored on each of, possibly, many servers for subsequent transmission to the users' set top boxes.

Unfortunately, embedding assets such as Navigation assets within the content places a severe limitation on changes to the assets. For example, if a bitmap asset must be changed to provide new graphic data, the content files for all navigation screens using that bitmap need to be re-multiplexed, redistributed, and re-loaded onto all servers. Additionally, the multiplexing of the Navigation assets and content results in a duplication of the Navigation asset data within each of a plurality of content streams including the data.

Therefore, it is seen to be desirable to provide a method and apparatus for inserting assets, such as navigation assets, into a content stream in a manner avoiding the above-described problems.

SUMMARY OF THE INVENTION

The disadvantages heretofore associated with the prior art are overcome by the present invention of a method and apparatus for transport encoding asset data and content data, multiplexing the transport encoded content data with a plurality of NULL transport packets to provide "place holder" for the asset data transport packets, and replacing the NULL transport packets with asset data transport packets prior to transmitting the multiplexed transport stream to a set top box.

Specifically, in an information distribution system providing content data and asset data to at least one subscriber, an apparatus according to the invention comprises: a NULL packet inserter, for inserting NULL transport packets within a transport stream including content packets; and a transport processor, for replacing at least some of the NULL packets with asset packets to produce a transport stream including content packets and asset packets.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

While the invention will be primarily described within the context of an interactive information distribution system, it should be noted that the invention has broad applicability to any system in which a data stream generated by combining fixed packet length data sub-streams is subject to regeneration due to, illustratively, modifications or changes made to one of the data sub-streams.

Figure 1:
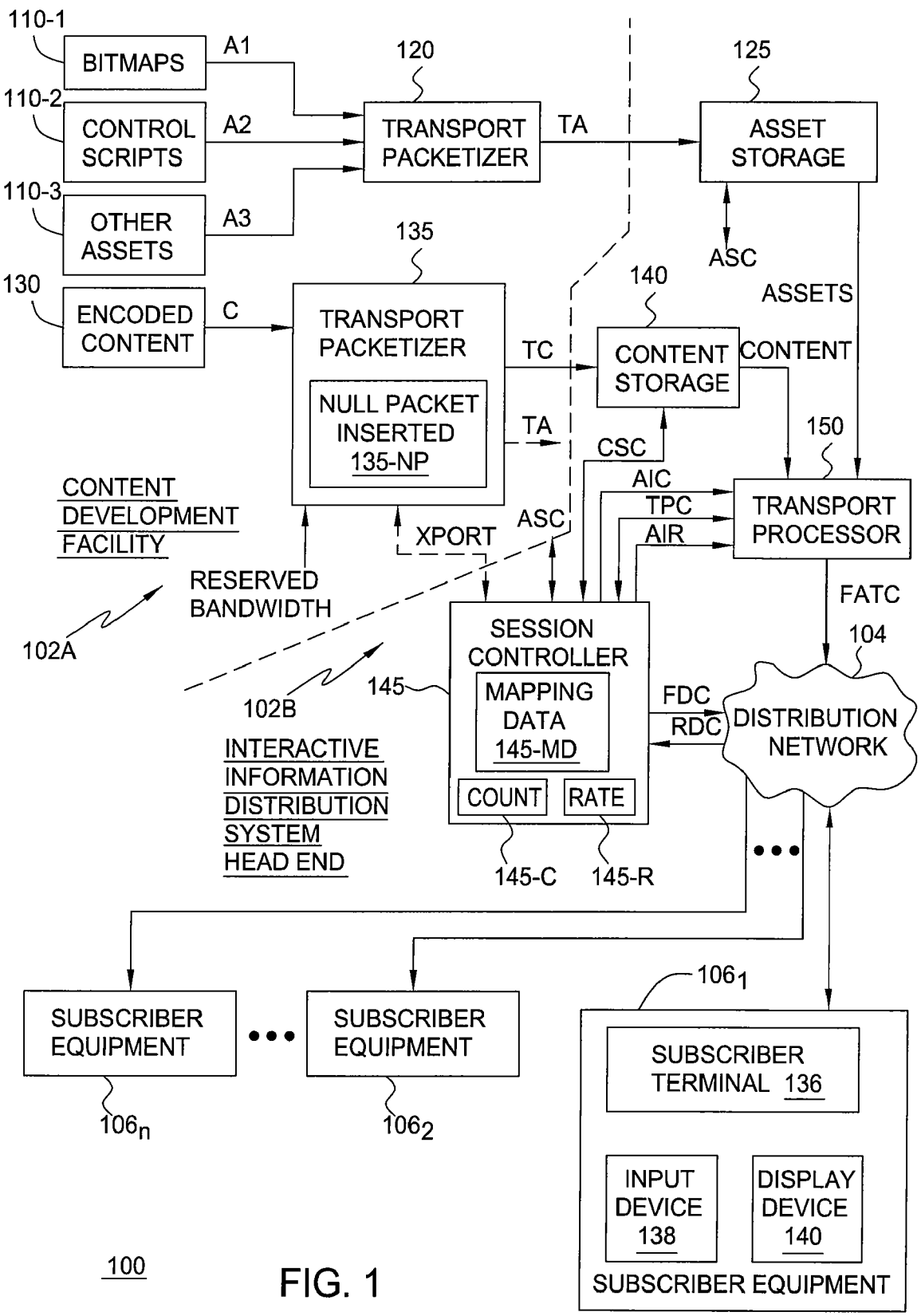
FIG. 1 depicts a high level block diagram of an interactive information distribution system.

FIG. 1 depicts a high level block diagram of an interactive information distribution system. Specifically, FIG. 1 depicts a high level block diagram of an interactive information distribution system 100 containing the present invention. The system 100 contains service provider equipment 102, a distribution network 104 and subscriber equipment 106$_n$, where n is an integer greater than zero.

The service provider equipment 102 comprises a plurality of asset sources 110, a first transport packetizer 120, an asset storage module 125, an encoded content source 130, a second transport packetizer 135 including a null packet inserter 135-NP, a content storage module 140 and a session controller 145 including a mapping data memory region 145-MD, a count memory region 145-C and a rate memory region 145-R. The functionality of the service provider equipment 102 may be divided into those functions typically provided by a content development facility (CDF) 102A and those functions provided by an interactive information distribution system (IIDS) 102B. A content development facility receives encoded content from, for example, a content encoding facility where Navigation assets and/or other assets are developed or aggregated. The CDF formats the content and assets into, for example, MPEG-2 transport stream files and distributes the resultant files to IIDS locations. The CDF functionality comprises the asset sources 110, the first transport packetizer 120, the encoded content source 130 and the second transport packetizer 135. The operation of the CDF 102A and IIDS 102B will be described within the context of a system 100 including all the relevant functions. However, it shall be noted that the CDF functions may be implemented in a CDF that is physically remote from the remaining functions of the system 100. The CDF functions may also be performed prior to the actual need for the assets and/or content.

The service provider equipment 102 processes content data and asset data to provide, respectively, a content data transport stream CONTENT and an asset data transport stream ASSETS. The asset data transport stream ASSETS includes a plurality of transport packets carrying asset data. The content data transport stream CONTENT includes a plurality of NULL transport packets interspersed with content transport packets such that the NULL packets "reserve" a portion of the content data stream sufficient to accommodate the asset data packets within the asset data stream ASSETS. The service provider equipment 102, in response to a subscriber request for a content stream, provides a version of the requested content stream in which some or all of the NULL packets have been replaced by asset data packets. In this manner, the service provider equipment 102 is able to adapt the asset data provided to a subscriber without reprocessing the content data.

The asset sources comprise, illustratively, bit map imagery 110-1, control scripts 110-2 and other assets 110-3. The bit map imagery 110-1, control scripts 110-2 and other assets 110-3 are provided to the first transport packetizer 120 via respective stream or signal paths A1, A2 and A3. The assets may comprise, e.g., Navigation assets that are used by a set top terminal to interactively navigate or view the offerings of the information distribution system 100. The first transport packetizer 120 packages the received asset streams A1-A3 into appropriate MPEG streams, such as video streams, audio streams, data streams and the like to produce a transport stream TA, illustratively an MPEG-2 transport stream, that is coupled to the asset storage module 125. Specifically, the transport stream TA (including packaged assets) is distributed from the CDF 102A to the asset storage module 125 of the IIDS 102B. The asset storage module 125 communicates with the session controller 145 via an asset control signal ASC to provide storage location information associated with each stored asset stream.

The encoded content source 130, illustratively a means of receiving MPEG-2 encoded content and other content from a studio or other source of content, provides a content stream C to the second transport packetizer 135.

The second transport packetizer 135 packetizes the content stream C to produce a transport stream TC, illustratively an MPEG-2 transport stream, that is coupled to the content storage module 140. In response to a control signal RESERVED BANDWIDTH, the null packet inserter 135-NP of the second transport packetizer 135 operates to intersperse NULL packets with the content packets within the content transport stream TC.

The number of NULL packets interspersed with the content data packets "reserves" a portion of the content data stream sufficient to, ideally, accommodate all of the asset data packets. That is, the amount of bandwidth to be reserved by interspersing NULL packets (e.g., 300 kilobits per second of a 3.6 Megabits per second bitstream) is indicated to the NULL packet inserter 135-NP via the control signal RESERVED BANDWIDTH. The number of NULL packets may be predetermined or calculated.

In one embodiment of the invention a default number of NULL packets is inserted into the multiplexed transport stream including null packets and content packets. The default number of NULL packets may be fixed or may be defined as a ratio (e.g., one null packet for every four content packets).

The session controller 145 (or session manager) provides session control of the information flowing to and from the content 140 and asset 125 storage modules, and may be generally described as a system providing or controlling communications between, e.g., a cable system head-end and one or more set top terminals. The session controller 145 produces an asset storage control signal ASC for controlling and communicating with the asset storage module 125, a content storage control signal CSC for controlling and communicating with the content storage module 140, and a transport processor control signal TPC for controlling and communicating with the transport processor 150.

The session controller 145 communicates with the asset storage module 125 and content storage module 140 to determine appropriate mapping of content streams or files stored on the content storage module 140 to asset streams or files stored on the asset storage module 125. This mapping information is stored within the mapping data memory portion 145-MD of the session controller 145.

In one embodiment of the invention, the session controller 145 provides an asset injection rate (AIR) signal and an asset injection count (AIC) signal to the transport processor 150. The asset injection rate is stored in the rate memory location 145-R, while the asset injection count is stored in the count memory location 145-C.

The asset injection rate (AIR) signal indicates to the transport processor 150 a desired rate at which asset packets should be injected into a content stream including NULL packets. The asset injection rate refers to the number of NULL packets to be utilized for asset transport. A maximum asset injection rate utilizes every NULL packet to transport an asset stream. In lower asset rates, some NULL packets are not utilized.

The asset injection count (AIC) signal indicates to the transport processor 150 the number of times that a particular asset should be repeated. For example, in response to an AIC signal indicative of a count of three, the transport processor will insert each asset packet into the FATC three times. The three insertions may be consecutive or an entire asset stream may be injected three times.

In response to a user request for a particular content file, the session controller 145 causes the requested content file to be streamed to the transport processor 150. Additionally, the session controller 145 utilizes the mapping data 145-MD to determine which asset data stream or file (if any) is associated with the requested content stream or file. The session controller 145 causes the requested asset file to be streamed to the transport processor 150 from the asset storage module 125.

The session controller 145 sends data, such as commands, encryption keys and the like to set top boxes via a forward data channel (FDC). The session controller 145 receives data, such as information stream requests and session initiation data (set top identification, capability, and the like) via a reverse data channel (RDC). The FDC and RDC are supported by the distribution network 104 and comprise relatively low bandwidth data channels, such as 1-2 megabits per second data channels utilizing QPSK, QAM or other modulation techniques. The FDC and RDC are also known as "out of band" channels, where a relatively high bandwidth forward application transport (FAT) channel is known as an "in-band" channel.

The session controller 145 contains an interface device for sending control information via the forward data channel FDC and receiving control information via the reverse data channel RDC using so-called "out of band" carrier frequencies.

The transport processor 150 accomplishes all of the forward content channel transmission interface requirements of the system 100 of FIG. 1. Specifically, the transport processor 150 is coupled to subscriber equipment via a forward applications transport channel (FATC). The forward application transport channel (FATC) is supported by the distribution network 104 and comprises a relatively high bandwidth communications channel well suited to carrying video, audio and data such as, for example, multiplexed MPEG-2 transport packets. The FATC is also known as the "in-band" communications channel. It should be noted that data normally conveyed to a set top box via the FDC may be included in the FATC data stream.

The transport processor 150 contains a multiplexer or combiner for detecting NULL packets within the content stream CONTENT, and for replacing some or all of those NULL packets with asset packets from the asset stream ASSET to form a combined content and asset stream. The transport processor 150 also contains a modulator for modulating the combined content and asset stream onto one or more carrier frequencies for transmission on the FATC, the so-called "in band" carrier frequencies.

The distribution network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for forward and reverse data channels that transport information to and from the set top terminal must be able to carry unidirectional, asynchronous packetized data such as that defined in the MPEG video and audio signal transmission protocol, and the like. There are a number of such transport protocols available.

The subscriber equipment 106$_n$ comprises a subscriber or set top terminal or set top box 136, a display device 140 (e.g., a conventional television) and a user input device 138 (e.g., a remote control). Each set top terminal 136 receives the data streams from the FATC, demodulates the received data streams and, in the case of video streams, processes the demodulated video streams for subsequent display on the display device 140. In addition, the set top terminal 106 accepts commands from the remote control input device 138 or other input device. Those commands requiring processing at the lead end are formatted, modulated, and transmitted through the distribution network 104 to the session controller 145. Typically, this transmission is accomplished through the RDC. These commands are preferably transmitted through the same network used to transmit information to the set top terminal. However, the RDC coupling the set top terminal to the server may be a separate network, e.g., a FATC through a television cable network and a RDC through a telephone network. The telephone network could also support the FDC.

The session controller 145 interprets each command sent from the set top terminal through the RDC and adapts other functional elements (e.g., the storage modules) in response to the subscriber request (e.g., send a requested movie and associated asset data).

Session control commands, such as navigation commands, are implemented by the session controller 145 with the set top terminal 136. Each command is implemented by the execution of central scripts by the set top terminal 136. The central scripts are transmitted to the set top terminal 136 (via the FATC) within the asset data in response to requests transmitted by the set top terminal 136 (via the RDC). It is noted that each control script includes links to other control scripts stored at the IIDS head end 102B. In this manner, set top terminal memory is conserved. The control scripts control both information sessions, such as the presentation of video to the television screen, and navigator functions, such as menus facilitating selection of a video program. The graphical data and other asset data used to provide the user interface at the set top terminal 136 comprises asset data, such as navigator asset data that is processed by the service provider equipment 102 of the present invention.

Figure 2A:
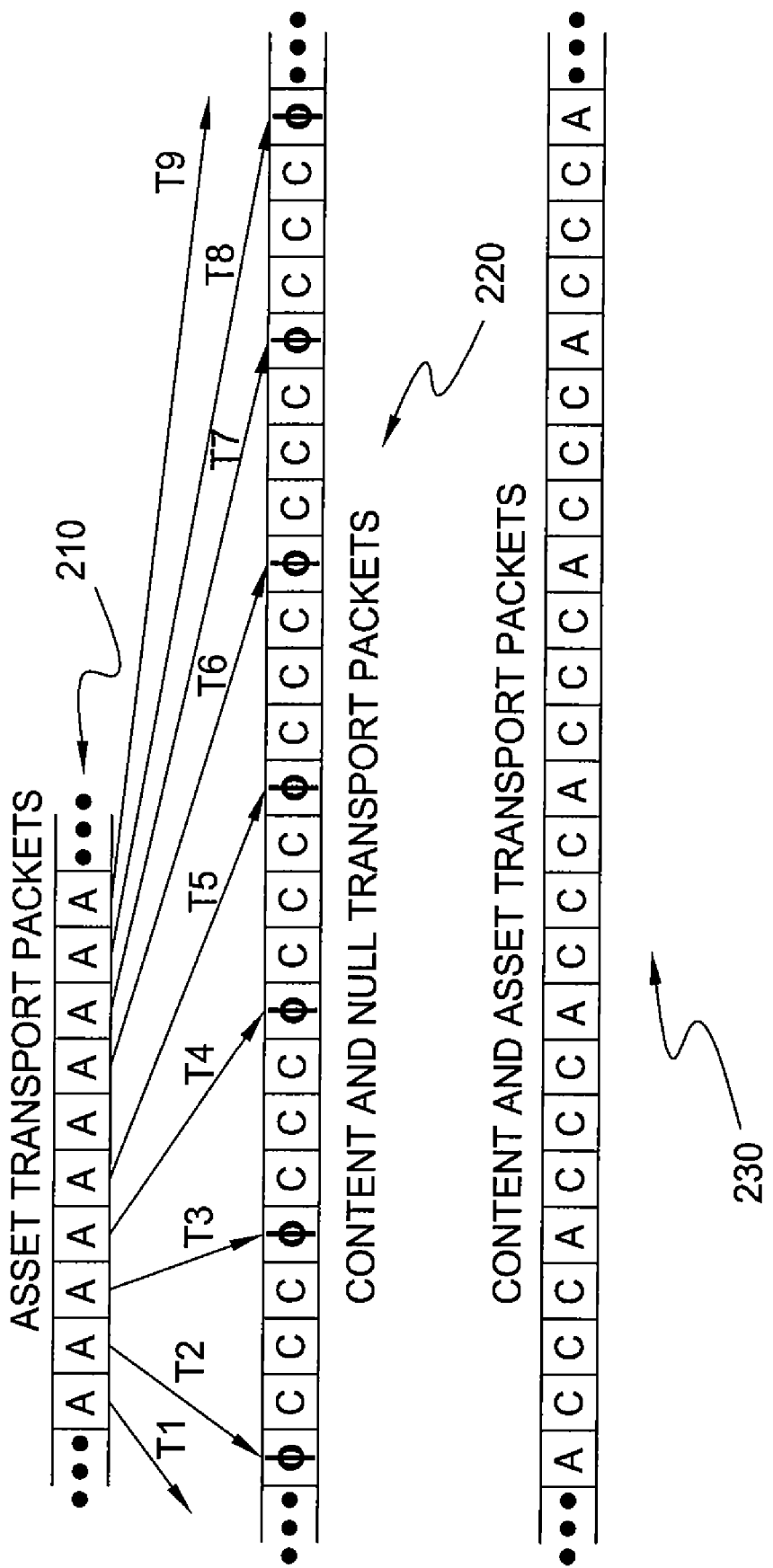
FIG. 2 depicts a graphical representation of several packetized streams useful in understanding the invention.

FIG. 2A depicts a graphical representation of several packetized streams useful in understanding the invention. Specifically, FIG. 2A depicts graphical representations of an asset transport stream 210, a content and NULL transport stream 220 and a content and asset transport stream 230.

The asset transport stream 210 is depicted as plurality of asset transport packets, where each transport packet includes a portion of the asset data. The asset data packets are denoted by the letter "A" within the asset stream representation 210. Illustratively, referring to the system 100 of FIG. 1, the NAVIGATION ASSETS stream provided by the asset storage module 125 to the transport processor 150 is structurally similar to the asset stream representation 210 of FIG. 2A.

The content and NULL transport stream 220 is depicted as a plurality of content data transport packets interspersed with NULL transport packets. Specifically, the content and NULL transport stream 220 comprises a repeating sequence of three content data packets followed by a single NULL packet. The content data packets are denoted by the letter "C" while the NULL packets are denoted by the NULL symbol (i.e., "Ø"). Illustratively, referring to the system 100 of FIG. 1, the CONTENT stream provided by the content storage module 140 to the transport processor 150 is structurally similar to the content and NULL stream representation 220 of FIG. 2A.

Each of the asset data packets A in the asset transport stream 210 is associated with a corresponding NULL packet Ø in the content and NULL transport stream 220, as indicated by the correspondence arrows T1-T9. This correspondence is depicted for illustrative purposes only, since there need not be a strict correspondence of particular asset packets to particular NULL packets. It should be noted that NULL packets may be skipped (i.e. unutilized) such that a lower "asset injection rate" is provided. That is, the rate or utilization level of the NULL packets may be reduced by not inserting asset packets into every available NULL packet. The utilization level of the NULL packets may be described in terms of a percentage of available NULL packets, a percentage of available NULL packets for a given period of time (or bandwidth), or any other convenient metric. Moreover, asset packets may be inserted repeatedly into the asset and NULL transport stream, such that an "asset injection count" above unity is provided. That is, the entire asset packet stream may be repeatedly inserted such that a set top terminal may reacquire an asset stream that has been incorrectly acquired. NULL packets may be left unutilized, especially in the case of a relatively small asset stream.

The content and asset transport stream 230 is depicted as a plurality of content data transport packets interspersed with asset transport packets. Specifically, the content and asset transport stream 230 comprises a repeating sequence of three content data packets followed by a single asset packet. The content data packets are denoted by the letter "C" while the asset packets are denoted by letter "A." Illustratively, referring to the system 100 of FIG. 1, the FATC stream provided by the transport processor to the subscriber equipment 106 includes information streams that are structurally similar to the content and asset stream representation 230 of FIG. 2.

It should be noted that it is not necessary for each NULL packet to be replaced by an asset packet. However, it is preferable to have a sufficient number of NULL packets within the content and NULL packet stream to provide for all of the asset packets to be included in the stream provided to the subscriber. Thus, the transport processor 150 of FIG. 1 operates to replace either some or all of the NULL packets with the content and NULL packet stream to provide a content and asset stream.

Figure 2B:
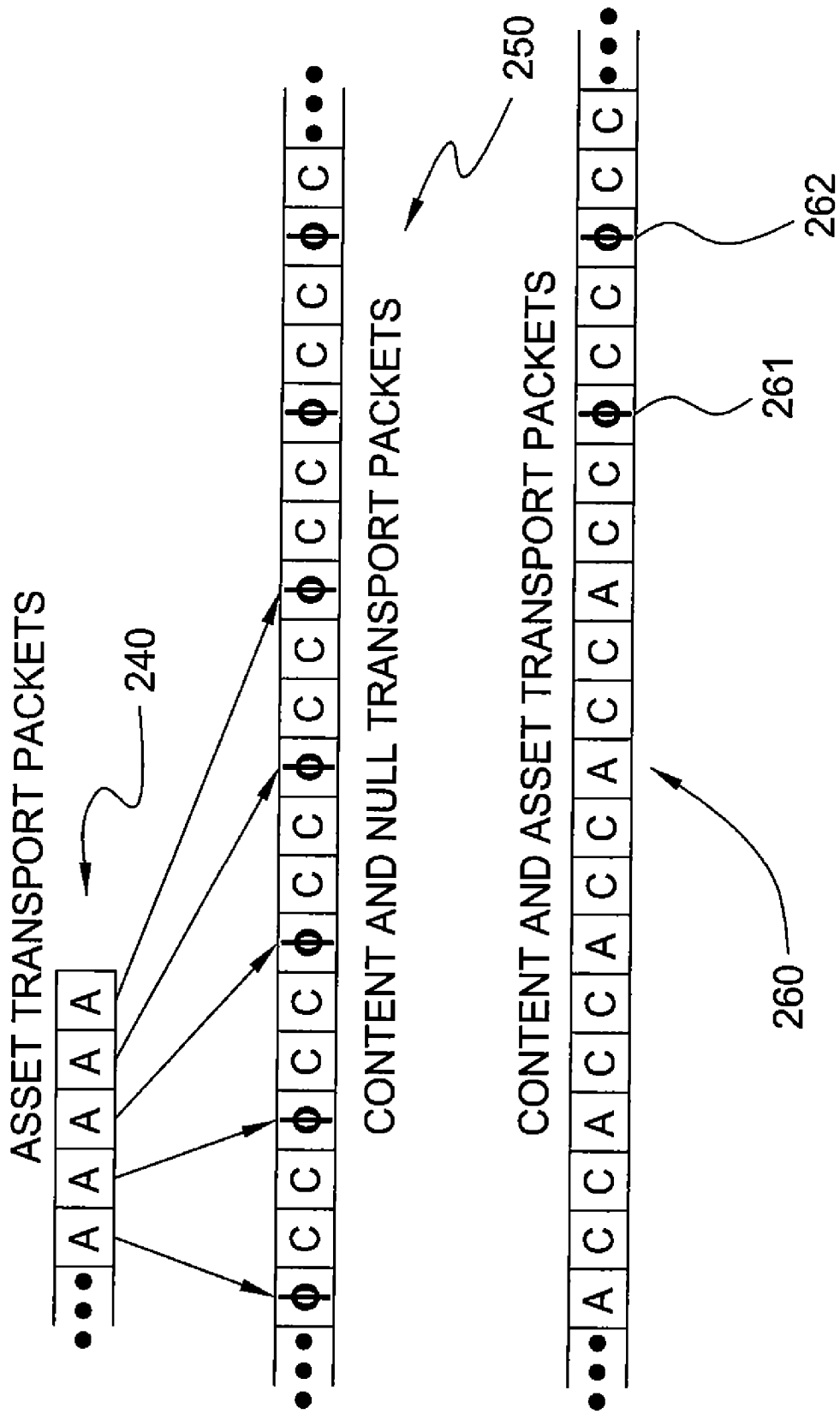

FIG. 2B depicts a graphical representation of several packetized streams useful in understanding the invention. Specifically, FIG. 2B depicts graphical representations of an asset transport stream 240, a content and NULL transport stream 250, and a content and asset transport stream 260.

FIG. 2B differs from FIG. 2A in that the content and NULL transport stream 250 includes more frequently interspersed NULL packets (i.e., one NULL packet after every two content packets), and the terminal or end portion of the asset transport stream 240 is depicted. Thus, it is noted that after replacing NULL packets in the content and NULL stream 250 with asset packets found in the asset transport stream 240, the resulting content and asset transport stream 260 includes a plurality of remaining NULL packets 261, 262.

With respect to the content and NULL packet transport streams 220 and 250, it is important to note that the content and NULL transport stream 250 of FIG. 2B allocates a larger portion of bandwidth to the transport of asset packets. As previously discussed, a control signal RESERVED BANDWIDTH provided to the second transport packetizer 235 is indicative of an amount of bandwidth to be reserved for the transport of asset packets. Thus, this control signal caused a higher bandwidth allocation for the content and NULL transport stream 250 than for the content and NULL transport stream 220.

Figure 3:
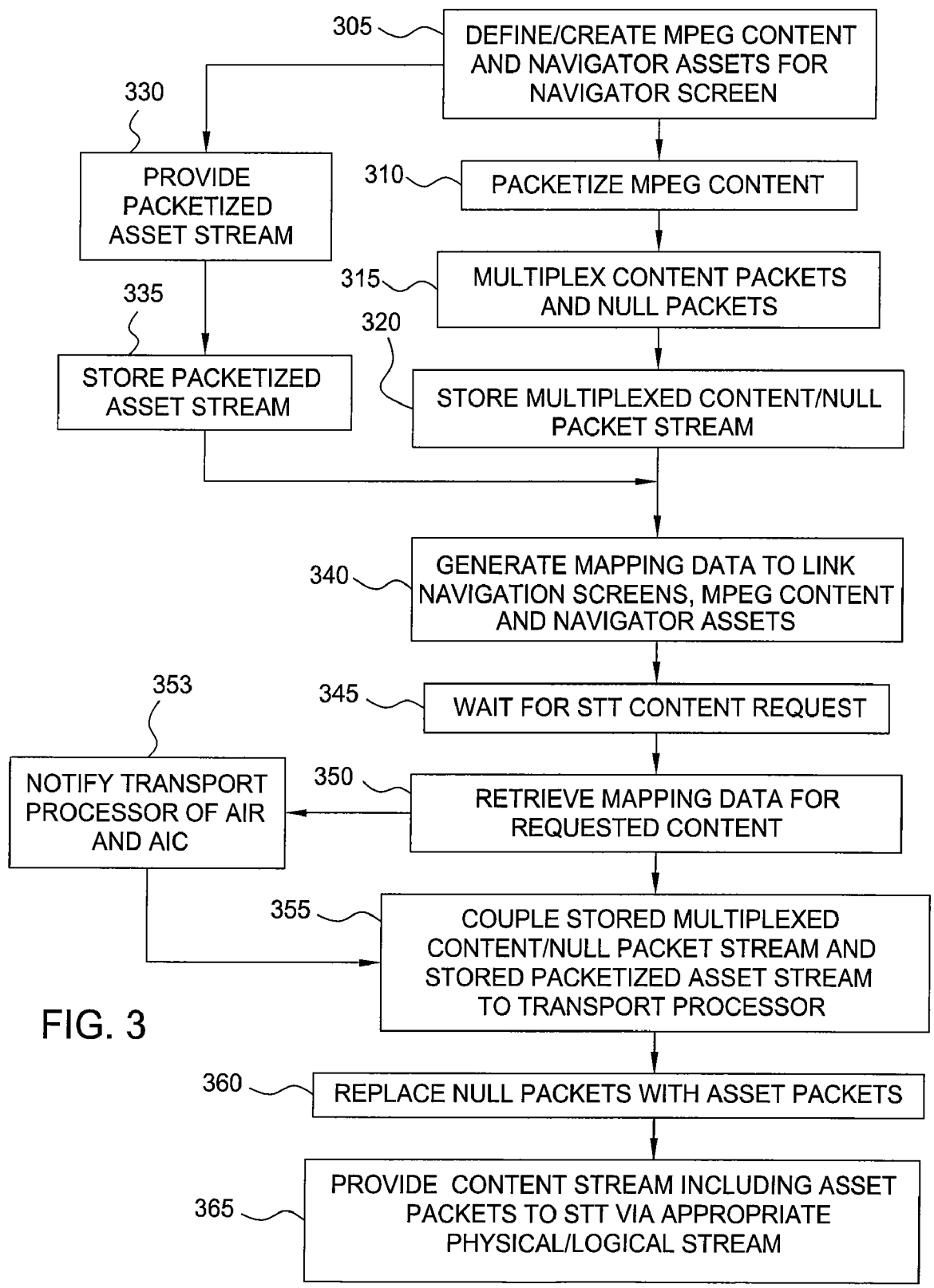
FIG. 3 depicts a flow diagram of a method for processing content and asset information according to the invention.

FIG. 3 depicts a flow diagram of a method for processing content and asset information according to the invention. The method 300 of FIG. 3 may be considered as several separate methods. Specifically, steps 305 through 320 define a method for processing content information, steps 305 and 330 through 335 define a method for processing asset information and steps 340 through 365 define a method for providing processed content and asset information to a set top terminal.

At step 305 the MPEG content and navigator aspects for a navigator screen are defined or created. That is, at step 305 the video information, control information and graphical information for, e.g., a navigator screen having respective control, video and graphics layer is defined or created. The method 300 then proceeds to step 310.

At step 310 the MPEG content is packetized. That is, at step 310 the MPEG video information defined or created at step 305 is converted into a plurality of information packets, such as MPEG transport packets. This function may be performed by the transport packetizer 135 of the information distribution system 100 of FIG. 1. The method 300 then proceeds to step 315.

At step 315 the, illustratively, MPEG transport packets including content information are multiplexed with a plurality of null packets. A null packet comprises an MPEG transport packet having no useful information and serving the sole purpose of occupying space within an MPEG transport stream. This function may be performed by the null packet inserter 135-NP of the system 100 of FIG. 1. The method 300 then proceeds to step 320.

At step 320 the multiplexed content/null packet stream is stored in, illustratively, the content storage module 140. The method 300 then proceeds to step 340.

The above-described steps (310-320) describe the processing of the content defined or created at step 305. The asset information defined or created at step 305 is similarly processed as will now be described. It should be noted that the asset processing and content processing may occur sequentially in either order or simultaneously.

At step 330 the asset streams A1-A3 are packetized into, illustratively, MPEG-2 transport packets and multiplexed to produce a packetized asset stream TA. This function is performed by the first transport packetizer 120 of the system 100 of FIG. 1. The method 300 then proceeds to step 335, where the packetized asset stream TA produced by the transport packetizer 120 is stored in, illustratively, the asset storage module 125. The method 200 then proceeds to step 340.

At step 340 mapping data linking the content and asset data (e.g., navigation screens, MPEG content and navigation assets) is generated. That is, mapping data, which is used to link the multiplexed content/null packet stream stored in the content storage module 140 to the packetized asset stream stored in the asset storage module 125, is generated such that subsequent processing of the streams by the transport processor 150 may be used to combine video, associated audio, and assets, such as navigation assets. The method 300 then proceeds to step 345.

It should be noted that the generation of mapping data is depicted as occurring after the storage of the content TC and asset TA transport streams in the asset storage 125 and content storage 140 modules respectively. However, it will be appreciated by those skilled in the art that mapping data may be produced contemporaneously with the generation of those streams.

At step 345 the method 300 waits for an set top terminal content request. That is, at step 345 the session controller 145 interacting with a subscriber terminal 136 waits for a request from that subscriber terminal for content stored within the content storage module 140. The method 300 then proceeds to step 350.

At step 350, in response to the set top terminal content request, mapping data for the requested content is retrieved from the mapping data memory portion 145-MD of the session controller 145. The retrieved mapping data is used to identify which packetized asset stream within the asset storage module 125 is associated with the content/null packet stream within the content storage module 140 that has been requested by the set top terminal. The method 300 then proceeds to step 353.

At optional step 353, the session controller 145 provides to the transport processor 150 one or both of the asset injection rate (AIR) parameter and the asset injection count (AIC) parameter. In response, the transport processor 150 adjusts the asset injection rate and/or the number of times an asset is injected (asset injection count).

At step 355 the stored multiplex/content null packet stream requested by the subscriber and the stored packetized asset stream associated by the mapping data are coupled to the transport processor 150 to be combined.

At step 360, null packets within the content/null packet stream retrieved from the content storage module 140 are replaced, as necessary, with asset packets from the packetized asset stream retrieved from the asset storage module 125 (as defined by the mapping data). Thus, in the case of a multiplexed content/null packet stream in which every, for example, fourth transport packet comprises a null packet, sufficient null packets to accommodate the asset packets retrieved from the asset storage module 125 are replaced. Ideally, every null packet will be replaced by an asset packet such that no bandwidth is wasted. However, since it is important to assure adequate levels of system performance and adequate quality of interaction from the point of view of a subscriber, it is likely that an excess number of null packets is advantageously provided such that unusually large asset streams may be accommodated without unduly degrading system performance.

At step 365 the content stream including the asset packets is provided to the subscriber terminal or STT via the appropriate physical and logical channels. These physical and logical channels are determined at the time the set top terminal establishes a session with the session controller 145.

Various modifications to the above-described embodiments are contemplated by the inventor. For example, while the asset and content storage functions are depicted in FIG. 1 as being implemented using separate asset 125 and content 140 storage modules, a single storage module may be utilized to realize these functions. Moreover, within the context of an information distribution system having a plurality of information servers, these functions may be distributed over several information servers. For example, a central or asset server may be used to hold a "gold" copy of asset data that is periodically used to update asset data stored in other servers along with content data.

It should be noted that while the function of mapping data between content and asset data is performed with respect to the depicted mapping data 145-MD element of the session controller 145, the mapping data 145-MD may be stored in the single storage module or either of the asset and content storage modules. It is only necessary that the entity controlling the distribution of the content stream CONTENT and the asset stream ASSET utilize the mapping data 145-MD such that the asset stream appropriate to a requested content stream is provided to the transport processor 150 along with the requested content stream.

Although various embodiments which incorporate the teachings of the present invention have been shown and described in detail herein, those skilled in the art can readily devise many other varied embodiments that still incorporate these teachings.

What is claimed is:

1. A method comprising:
   storing asset packets in a memory, said asset packets comprising navigational information adapted to enable presentation of navigational menus for selecting content;
   receiving a transport stream comprising content packets and NULL packets;
   generating mapping data indicative of a location of the NULL packets within said transport stream;
   finding, using said mapping data, the location of a next NULL packet within said transport stream;
   determining that said next NULL packet should be replaced; and
   replacing said next NULL packet with an asset packet.

2. The method of claim 1, wherein the asset packets are stored in at least one storage module.

3. The method of claim 1, wherein the mapping data is stored in at least one storage module.

4. The method of claim 3, wherein said step of generating mapping data is performed prior to said step of storing the asset packets.

5. The method of claim 1, wherein said steps are performed using a plurality of servers, wherein at least one server is used to hold a master copy of asset packets for periodically updating asset packets stored in other servers.

6. The method of claim 1, wherein at least two servers are used to perform said steps, one of said servers storing a master copy of asset packets, said method further comprising:
   periodically updating stored asset packets using the asset packet master copy.

7. The method of claim 1, further comprising:
   generating said transport stream including content packets and NULL packets.

8. The method of claim 1, wherein determining that said next NULL packet should be replaced is in accordance with an asset injection rate.

9. The method of claim 8, wherein the asset injection rate is an asset rate injection (ARI) signal, said ARI defining a rate of NULL packet replacement.

10. The method of claim 8, wherein the asset injection rate is an asset injection count (AIC) signal, said AIC defining a number of times an asset is inserted into the transport stream.

11. The method of claim 1, further comprising:
    identifying, in accordance with said mapping data, asset files associated with a user request; and
    streaming said identified asset files to a transport processor.

12. An apparatus comprising:
    means for storing asset packets;
    means for generating mapping data indicative of a location of NULL packets within a transport stream comprising content packets and NULL packets; and
    means for replacing at least a portion of NULL packets with one or more of the asset packets, including finding, using said mapping data, the location of a next NULL packet within said transport stream; determining that said next NULL packet should be replaced by an asset packet; and replacing said next NULL packet with a next asset packet within the transport stream, the asset packets comprising navigational information adapted to enable presentation of navigational menus for selecting content.

13. The apparatus of claim 12, wherein:
    said means for replacing comprises a transport processor; and
    said means for storing comprises an asset storage module.

14. Apparatus, comprising:
    a memory, for storing asset packets comprising navigational information adapted to enable presentation of navigational menus for selecting content;
    a transport processor configured to:
       receive a transport stream comprising content packets and NULL packets,
       find, using mapping data indicative of a location of the NULL packets within said transport stream, the location of a next NULL packet within said transport stream,
       determine that said next NULL packet should be replaced, and
       replace said next NULL packet with an asset packet; and
    a session controller, for controlling said memory and transport processor in response to a user request for content.

15. The apparatus of claim 14, wherein:
    said session controller is periodically in communication with a server storing a master copy of asset packets, said session controller periodically using said master copy of asset packets to update said asset packets within said memory.

16. The apparatus of claim 14, wherein:
said session controller uses an asset rate injection (ARI) signal to control a rate of NULL packet replacement by said transport processor.

17. The apparatus of claim 14, wherein:
said session controller uses an asset injection count (AIC) signal to define a number of times an asset is inserted.

18. The apparatus of claim 14, wherein determining that said next NULL packet should be replaced is in accordance with an asset injection rate.

19. The apparatus of claim 14, wherein said apparatus is included within head end equipment within an information distribution system.

20. A method comprising:
retrieving from a memory a stored packetized transport stream comprising a plurality of packets including content data packets and null packets interspersed throughout the content data packets, wherein the null packets are interspersed according to a pattern determined at the time the stored packetized transport stream was generated;
finding, using mapping data indicative of a location of the null packets within said transport stream, the location of a next null packet within the stored packetized transport stream;
determining that said next null packet should be replaced;
replacing said next null packet with an asset packet, wherein the replacing creates a modified transport stream; and
transmitting the modified transport stream over a network.

21. The method of claim 20, wherein the pattern is dependent upon a reserved bandwidth sufficient to support transmission of the asset packet with the content data packets over the network.

22. The method of claim 20, wherein the asset packet comprises video streams and audio streams.

23. The method of claim 20, wherein the replacing comprises injecting the asset packet in accordance to a specified asset packet injection rate.

24. The method of claim 20, wherein the null packets of the stored packetized transport stream are replaced in accordance to a rate that replaces all null packets of the stored packetized transport stream.

25. The method of claim 20, wherein the null packets of the stored packetized transport stream are replaced in accordance to a rate that does not replace all null packets of the stored packetized transport stream.

26. The method of claim 20, wherein the null s ackets of the stored packetized transport stream are replaced in accordance to an asset injection count corresponding to a number of times that a particular asset packet should be repeated.

27. The method of claim 20, wherein the asset packet comprises bitmap imagery for overlaying with content in the content data packets.

28. The method of claim 20, wherein the asset packet comprises navigation control scripts.

29. The method of claim 20, wherein the transport stream comprises an MPEG transport stream.

30. The method of claim 20, wherein the replacing is done in response to a subscriber request for content.

31. An apparatus comprising:
a first memory configured to store a packetized transport stream comprising a plurality of packets including content data packets and null packets interspersed throughout the content data packets, wherein the null packets are interspersed according to a pattern determined at the time the packetized transport stream was generated;
a second memory configured to store asset data packets relating to navigating through the content data packets; and
a processor configured to perform:
retrieving from the first memory the packetized transport stream comprising a plurality of packets including content data packets and null packets interspersed throughout the content data packets,
retrieving from the second memory the asset data packets; and
finding, using mapping data indicative of a location of the null packets within said packetized transport stream, the location of a next null packet within the packetized transport stream,
determining that said next null packet should be replaced, and
replacing said next null packet with a next asset packet, the replacing creating a modified transport stream.

32. The apparatus of claim 31, wherein the pattern is dependent upon a reserved bandwidth sufficient to support transmission of the asset data packets with the content data packets over a network.

33. The apparatus of claim 31, wherein the processor is further configured to transmit the modified transport stream over a network.

34. The apparatus of claim 31, wherein the asset data packets comprise video streams and audio streams.

35. The apparatus of claim 31, wherein the processor is configured to inject asset data packets according to a specified asset data packet injection rate.

36. The apparatus of claim 31, wherein the processor is configured to inject asset data packets at a rate that completely replaces all null packets.

37. The apparatus of claim 31, wherein the processor is configured to inject asset data packets at a rate that does not replace all null packets.

38. The apparatus of claim 31, wherein the processor is configured to inject asset data packets according to an asset injection count corresponding to a number of times that a particular asset packet should be repeated.

39. The apparatus of claim 31, wherein the asset data packets comprise bitmap imagery for overlaying with content contained in the content data packets.

40. The apparatus of claim 31, wherein the asset data packets comprise navigation control scripts.

41. The apparatus of claim 31, wherein the transport stream comprises an MPEG transport stream.

42. The apparatus of claim 31, wherein the processor is configured to replace one or more of the null packets in response to a subscriber request for content.

43. The method of claim 1, wherein the transport stream comprises video content.

44. The apparatus of claim 12, wherein the transport stream comprises video content.

45. The apparatus of claim 14, wherein the transport stream comprises video content.

46. The method of claim 20, wherein the stored packetized transport stream comprises video content.

47. The method of claim 31, wherein the packetized transport stream comprises video content.

* * * * *

UNITED STATES PATENT AND TRADEMARK OFFICE
CERTIFICATE OF CORRECTION

| | | |
|---|---|---|
| PATENT NO. | : 7,903,648 B2 | Page 1 of 1 |
| APPLICATION NO. | : 11/780053 | |
| DATED | : March 8, 2011 | |
| INVENTOR(S) | : Michael C. Bertram et al. | |

It is certified that error appears in the above-identified patent and that said Letters Patent is hereby corrected as shown below:

Column 11, Claim 26, Line 51:
Please delete "s ackets" and insert --packets--

Signed and Sealed this

Thirteenth Day of December, 2011

David J. Kappos
*Director of the United States Patent and Trademark Office*